J. R. PHELPS.
Potato-Planters.

No. 146,401.

Patented Jan. 13, 1874.

Witnesses.
E. Wolff
Alex F. Roberts

Inventor:
J. R. Phelps
Per [signature]
Attorneys.

UNITED STATES PATENT OFFICE.

JONATHAN R. PHELPS, OF CHATHAM, NEW YORK.

IMPROVEMENT IN POTATO-PLANTERS.

Specification forming part of Letters Patent No. 146,401, dated January 13, 1874; application filed September 13, 1873.

*To all whom it may concern:*

Be it known that I, JONATHAN R. PHELPS, of Chatham, in the county of Columbia and State of New York, have invented a new and useful Improvement in Potato-Planters, of which the following is a specification:

This invention consists of a cutter on a hollow rotating dropping-drum at the bottom of the hopper, in such relation with the passage to the dropping-tube that the potatoes, settling down upon the disk through the hole in the hopper, will be cut off in sufficient quantity for the seed of one hill and delivered into the passage to the tube. The invention also consists of a discharger combined with the cutter and the disk, so as to force out any of the cut pieces that may lodge in the throat between the cutter and the disk, and deliver them into the passage to the tube. The invention also consists of a spring pusher, combined with the cutter, to push the cut pieces into the passage.

Figure 1:
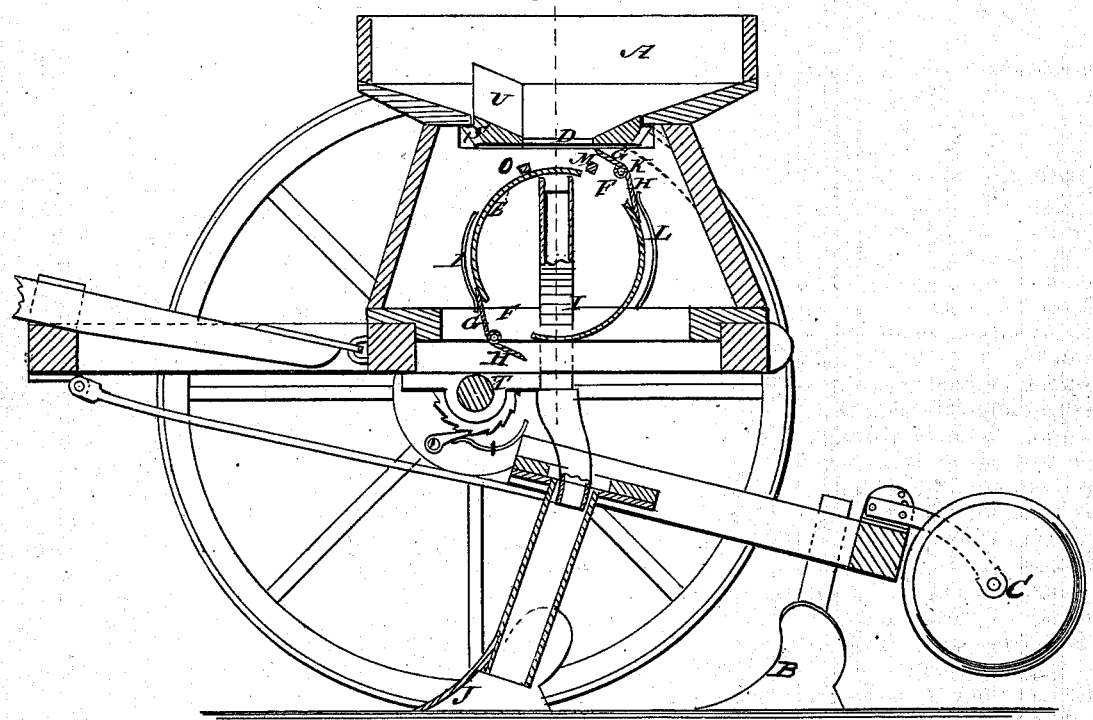
Figure 2:
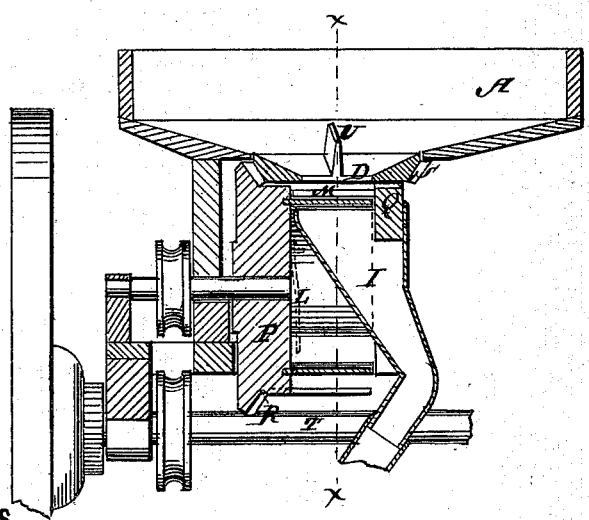

Figure 1 is a longitudinal sectional elevation of my improved machine, taken on the line $x$ $x$, Fig. 2; and Fig. 2 is a transverse sectional elevation taken on the line $y$ $y$ of Fig. 1.

A is the hopper for containing the seed. It is mounted on a truck having suitable furrow opening and closing plows B, and a roller, C, for pressing and regulating the depth of the planting, and smoothing the earth down on the seed after being planted. Below the hole D in the bottom of the hopper is a revolving hollow disk or drum, E, having a couple of holes, F, through its periphery, and over each hole a cutter, G, and a pusher, H. The cutters are fixed and run close under the hopper to cut off the potatoes protruding through the hole D to let them fall through the hole F into the upper end of the spout I, which projects into the hollow space in the drum through one open side and extends to the furrow-opener J. The pusher is jointed at one end to the support K, and is pressed at the other end down on the face of the disk by a spring, L. At the front side of the hole D, and above the face of the disk, is a fixed stud-pin or bar, M, extending across the drum to prevent small potatoes or pieces from escaping or being pushed out thereat; also, to force any that may adhere off into the passage F. Behind the said hole D is another stud, O, to prevent the pieces from falling back the other way, also to raise the pusher, so that as it escapes from said stud the springs will pull it down quickly and cause it to strike upon any pieces that may choke in the passage F and force them through. The stud-pin K, on which the pusher is pivoted, is carried by the rotating-wheel P, to which the drum is attached for being revolved. The wheel is geared to the truck-axle T by a belt and pulley, or other suitable means for revolving it. The stud-pins M and O are attached to the bar Q of the frame to which the tube is also attached. This wheel P has a toothed rim, R, which gears with a revolving ring, S, in the bottom of the hopper surrounding the feed-hole D, and carrying a stirrer or feeder, U, which revolves in the potatoes so as to keep them from clogging, and to scrape or push them into the hole. It is arranged in a plane tangential to the hole so as to push the potatoes toward the center of the hole.

Having thus described my invention, I claim as new and desire to secure by Letters Patent—

1. The combination of the hollow rotating drum E, hopper A, and dropping-tube I, said drum having one or more passages, F, for the seed, and the tube being arranged under the inner periphery of the drum, substantially as specified.

2. The combination of one or more cutters, G, with the hopper, drum, and tube, substantially as specified.

3. The combination of the discharger M with the hopper, drum, and cutter, substantially as specified.

4. The combination of the pusher H with the cutter and the drum E, substantially as specified.

5. The combination of the lifter O and spring L with the pusher and drum, substantially as specified.

J. R. PHELPS.

Witnesses:
T. B. MOSHER,
C. SEDGWICK.